United States Patent [19]

Wavish et al.

[11] Patent Number: 6,040,842

[45] Date of Patent: Mar. 21, 2000

[54] PROCESS CONTROL WITH EVALUATION OF STORED REFERENTIAL EXPRESSIONS IN A MULTI-AGENT SYSTEM ADAPTED FOR USE WITH VIRTUAL ACTORS WHICH ARE DIRECTED BY SEQUENTIALLY ENABLED SCRIPT AGENTS

[75] Inventors: Peter R. Wavish, West Hoathly; David M. Connah, Reigate, both of United Kingdom

[73] Assignee: U.S. Philips Corporation, New York, N.Y.

[21] Appl. No.: 08/840,366

[22] Filed: Apr. 29, 1997

[30] Foreign Application Priority Data

May 2, 1996 [GB] United Kingdom ................... 9609197

[51] Int. Cl.[7] .......................... G06T 13/00; G06T 15/70; G06F 15/18
[52] U.S. Cl. ............................................. 345/473; 706/46
[58] Field of Search ................................ 345/473; 706/46

[56] References Cited

U.S. PATENT DOCUMENTS

| 5,261,041 | 11/1993 | Susman | 345/473 |
|---|---|---|---|
| 5,596,695 | 1/1997 | Hamada et al. | 345/333 |
| 5,806,056 | 9/1998 | Hekmatpour | 706/46 |
| 5,890,146 | 3/1999 | Wavish et al. | 706/46 |

FOREIGN PATENT DOCUMENTS

| 9527952 | 10/1995 | WIPO . | |
| 96/00947 A2 | 1/1996 | WIPO | G08F 17/50 |

OTHER PUBLICATIONS

Geib, Christopher et al. "Sodajack: an Architecture for Agents that Search for and Manipulate Objects", Technical Report MS–CIS–94–16, University of Pennsylvania, Dept. of Computer and Information Science, Philadelphia, PA, pp. 1–14, Jan. 1994.

Genesereth, Michael R. and Ketchpel, Steven P. "Software Agents", Communications of the Association of Computing Machinery, ACM, v. 37, No. 7, pp. 6, 48–53, Jul. 1994.

Trappl, R. et al. "What Governs Autonomous Actors", Proc. Computer Animation '95, Los Alamitos: IEEE Computer Society Press, pp. 1–10, Apr. 1995.

Matsuoka, S. et al. "Highly Efficient and Encapsulated Re–use of Synchronization Code in Concurrent Object–Oriented Languages", SIGPLAN Notices, v. 28, No. 10, pp. 109–126, Oct. 1993.

Cheung, S. et al. Synchronizing Simulations in Distributed Interactive Simulation:, Proc. of Winter Simulation Conference, New York: IEEE Press, pp. 1316–1323, Dec. 1994.

Anonymous. "Object Specific Reasoning: Libby Levinson", hypertext document downloaded from 158. 130. 12.3 on Apr. 2, 1999, Nov. 1994.

(List continued on next page.)

*Primary Examiner*—Mark R. Powell
*Assistant Examiner*—Jeffrey A Rossi
*Attorney, Agent, or Firm*—Gregory L. Thorne

[57] ABSTRACT

A rule-based data processing apparatus includes a processor coupled with at least first and second stores. The first store holds respective defining rule-sets for two or more groups of agents. The second store holds data defining respective objects with associated qualifier terms. The first group, of agents defined as script agents, are arranged as a sequentially enabled chain, with one or more of the script agents including references to respective objects and specified qualifier terms. The second group, of agents defined as object agents, identify objects and specified qualifier terms from the script agents, and identify each instance of that object with a correct associated qualifier in the second store. The object agents handle referential expressions in a script or process specification by standing in for objects referred to. The object agents can be identified by markers in the script agents, but can also autonomously connect themselves to the objects and places that they represent, by pointers to where they are held in the second store as they become available during performance of the script.

16 Claims, 3 Drawing Sheets

OTHER PUBLICATIONS

Noser, H. "The Animation of Autonomous Actors Based on Production Rules", Proc. Computer Animation '96, Los Alimatos: IEEE Computer Society Press, pp. 47–57, Jun. 1996.

Perlin, K. "IMPROV: a System for Scripting Interactive Actors", Proceedings on Computer Graphics SIGGRAPH '96, New York: Association of Computing Machinery, pp. 205–216, Aug. 1996.

Wavish, P. et al. "Virtual Actors that can Perform Scripts and Improvise Roles", Proc. of the First Int'l Conference on Autonomous Agents, New York: Association on Computing Machinery, pp. 317–322, Feb. 1997.

Kakizaki, Ken 'ichi. "Generating the Animation of a 3D Agent from Explanation Text", Proc. of the 6th International Multimedia Conference (Bristol, UK), New York: Association of Computing Machinery, pp. 139–144, Sep. 1998.

"The Behaviour Language: User's Guide" R A Brooks, AI Memo, Massachusetts Institute of Technology Artificial Intelligence Laboratory, Apr. 1990.

"Simulating and Implementing Agents and Multiple Agent Systems" Proceedings of the European Simulation Multiconference 1991 at pp. 226–231.

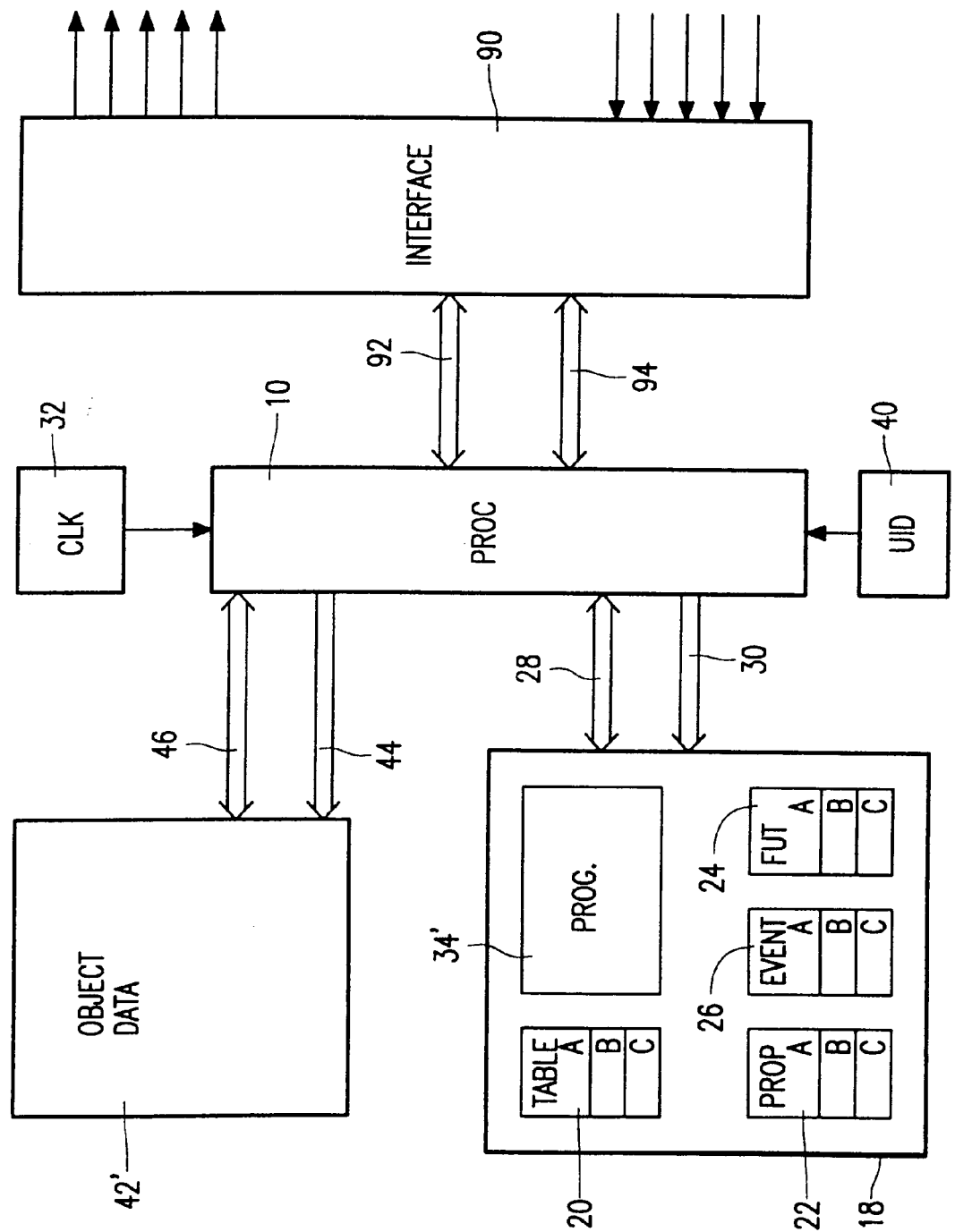

PROCESS CONTROL WITH EVALUATION OF STORED REFERENTIAL EXPRESSIONS IN A MULTI-AGENT SYSTEM ADAPTED FOR USE WITH VIRTUAL ACTORS WHICH ARE DIRECTED BY SEQUENTIALLY ENABLED SCRIPT AGENTS

BACKGROUND OF THE INVENTION

1. Field of the Invention

The present invention relates to rule-based data processing apparatuses and in particular to those having stored therein one or more agents, agent or each agent being defined by a set of rules, and each rule being in the form of a condition portion and an associated response portion, with the condition portion of each rule requiring the presence of one or more specified behaviour states or external inputs and the apparatus comprising means for responding to any said condition being satisfied by generating the associated response. The invention additionally, but not exclusively, relates to process control and interactive entertainment apparatuses based around such a rule-based data processing apparatus.

2. Description of the Related Art

Rule-based processor systems may support behaviour languages in which behaviours are either simple operations performed on a value, or rules, where a rule defines logical and temporal relations between events (behaviour state changes). Events associated with the condition portion of a rule—also known as the left hand side behaviours of a rule—cause subsequent events associated with the response portion (right hand side behaviour) of the rule. An example of such a rule-based real time language is Real Time ABLE (RTA), described in "Simulating and Implementing Agents and Multiple Agent Systems" Proceedings of the European Simulation Multiconference 1991 at pages 226–231. ABLE stands for Agent Behaviour LanguagE and is a highly concurrent production rule language for simulating agents and multiple agent systems, and provides for tighter integration of time with the production rule system. A further example of a rule-based language is given in "The Behaviour Language; User's Guide" by R A Brooks, Al Memo 1227, Massachusetts Institute of Technology Artificial Intelligence Laboratory, April 1990.

Whilst rule-based languages provide greater flexibility than more traditional programming languages, their propagating nature can still lead to rigidity in, for example, process control where activation of process stages is strictly controlled in terms of starting, intermediate and finishing rule conditions and responses with little flexibility for unprogrammed events. Modification of the process to accommodate even minor procedural changes is also not a simple matter, sometimes requiring recompilation of the whole program to accommodate a small delay/wait-state change.

Rule-based systems have been suggested as particularly suited for artificial intelligence applications where more complex behavioural simulations may be implemented in interconnected networks or modules of agents. The above-mentioned problems recur however when modelling interaction scenarios between virtual "actors", each in the form of a compound group of interconnected agents, with different agents governing the virtual actors response to environmental factors and the actions of the other virtual actors. If a "script" is to be followed (analogous to a linear process specification), all of the virtual actors required conditions and potential responses must be programmed into the script such that the interaction becomes a rigidly controlled process with little or no variation in successive runnings. From an observers point of view, the 'interaction' between the virtual actors is predictable and unrealistic.

A system which overcomes many of these problems is described in our co-pending United Kingdom Patent Application No. 9609189.7 which provides for script/process specification in the form of a sequentially enabled chain of script agents with which separate agents (operator agents) interact. By means of markers placed on the respective operator agents by the script agents, the operator agents are cued as any script agent carrying a reference to them is enabled (activated as a part of the propagation sequence). The respective rule populations making up each operator agent will determine how they interact with the script agents and their resultant output. Applied to the above mentioned scenario of virtual actors following a script, the chain of script agents now becomes a more adaptable frame work with which the operator agent virtual actors work, performing the lines or stage directions specified in the script agents but in a manner determined by their internal skills. The rigidity of direct scripting is thus reduced and the flexibility is greatly increased as changing operator agents is a relatively simple matter, with different operator agent internal skills leading to different performances of a common script.

A problem with the above system, as well as with explicit scripting techniques, is that they cannot simply handle referential expressions, that is to say script fragments in which objects or features are only specifically defined by their relationship to other objects or features. This is particularly acute where the relationship does not initially exist: for example, with the stage direction "Character A looks at the book on the table", there may be no book on a table in the early part of the script, such that a script agent cannot place markers on the features to which it refers. With the script agent chain system, an unacceptable delay may be introduced following the placing of a book on a table as the script agents carrying that referential expression establish markers to the book. In explicit scripting systems, the problem may be handled by adding an initialisation step such as "Locate table; locate book on table" (again introducing delay) or a compromise is made such as replacing the referential expression with "Character A looks at position x,y,z" (which removes any possibility of flexibility in the initial placing of the book).

As will be recognised, the problem of referential expressions is not restricted to the scripting of interactive entertainments. Considering an assembly line process, one stage of which involves tightening down six nuts introduced to respective upstanding studs on a subassembly, the writing of the control instructions would be greatly simplified if it were possible to use expressions such as "Tighten the nut on each shaft to torque K" rather than having to generate a specific identity for each nut and/or specify the exact locations to be visited for each tightening operation.

SUMMARY OF THE INVENTION

It is therefore an object of the present invention to provide a configuration of data processing apparatus which may provide the basis for more flexible control applications by an ability to handle referential expressions.

It is a further object of the invention to provide a means for process control, based on such a data processing apparatus, which is readily adaptable to changes in procedure.

It is yet a further object of the present invention to provide an interactive entertainment apparatus, based on such a data processing apparatus, where characters modelled as compound agents may interact with each other whilst following a script containing one or more referential expressions.

In accordance with the present invention there is provided a rule-based data processing apparatus comprising a processor coupled with first and second memory means, said first memory means having stored therein first and second groups of agents, each group being defined by respective sets of rules, said processor being arranged to run said respective sets of rules in parallel, and said second memory means having stored therein data defining a plurality of objects, at least some of which have a respective qualifier term associated therewith; characterised in that the agents of the first group (hereinafter "script agents") are arranged as a sequentially enabled chain, and one or more of said script agents includes a respective reference to one of said objects and a specified qualifier term, with each of the agents of the second group (hereinafter "object agents") being operable to identify an object and specified qualifier term from a script agent, to identify the or each instance of said object in the second memory means, to compare the specified qualifier term with the respective associated qualifier term of each identified object and, when a match occurs, to generate an identifying pointer for the identified and matched object.

The additional functionality from enabling the script at run-time as a set of autonomous agents, rather than as static objects, is further enhanced in the present invention by the provision of means to deal with referential expressions in the script such as "the red book on the table" which at the time the script agent is generated may have no referents. The invention provides another set of (autonomous) agents—the object agents—which stand in for the objects referred to, and so can be pointed to by markers in the script agents, but can also autonomously connect themselves to the objects and places that they represent (by pointers to where they are stored in the second memory) as they become available during performance of the script.

Suitably, the first memory means has stored therein at least one further group of agents (hereinafter an "operator agent"), the operator agent being arranged to carry out a selected one of two or more procedural steps, with the selection being made within the operator agent on the basis of one or more external factors, and with the selection operation within the operator agent being triggered prior to the enablement of a script agent carrying a marker identifying that operator agent, and subsequent to the enablement of a preceding script agent of the sequence. Such operator agents may control respective process stages or provide virtual actors for interactive drama as mentioned above with reference to our co-pending application, and one or more of the stored object associated qualifier terms may be controllably varied by one of said operator agents during the sequential enabling of the script agents.

In some circumstances, every script agent including a common object reference and specified qualifier term may identify a common object from the second memory means via a single object agent, with each of those script agents having a respective marker on that particular object agent. Thus, once "the book on the table" has been identified by an object agent, all subsequent script agents including the phrase will have a marker on the one object agent and will refer to the same object. However, in some circumstances it may be desirable to allow one phrase to identify differing objects at differing points through the script: to provide for this, an object agent may be configured to repeatedly check the qualifier term of the identified agent such that, should it change, the identifying pointer is removed, possibly followed by a repeat of the comparison process to see whether any other object can now be identified as matching. Alternatively, timer means may be provided coupled with the processor and arranged to count out a predetermined period following generation of the identifying pointer, with the respective object agent being arranged to delete that identifying pointer on expiry of the predetermined period, to repeat the identification of object instances within the second memory means and comparison of specified qualifiers, and to generate a further identifying pointer.

The present invention also provides a process control apparatus and an interactive entertainment apparatus based on the above-described data processing apparatus which, together with further features and advantages of the present invention are described hereinafter and in the attached claims, to which reference should now be made.

BRIEF DESCRIPTION OF THE DRAWING

Preferred embodiments of the present invention will now be described, with particular reference to RTA agents by way of example only, and with reference to the accompanying drawings, in which:

FIG. 3 shows a modified version of the apparatus of FIG. 1, according to a further embodiment of the present invention.

DESCRIPTION OF THE PREFERRED EMBODIMENTS

Figure 1:
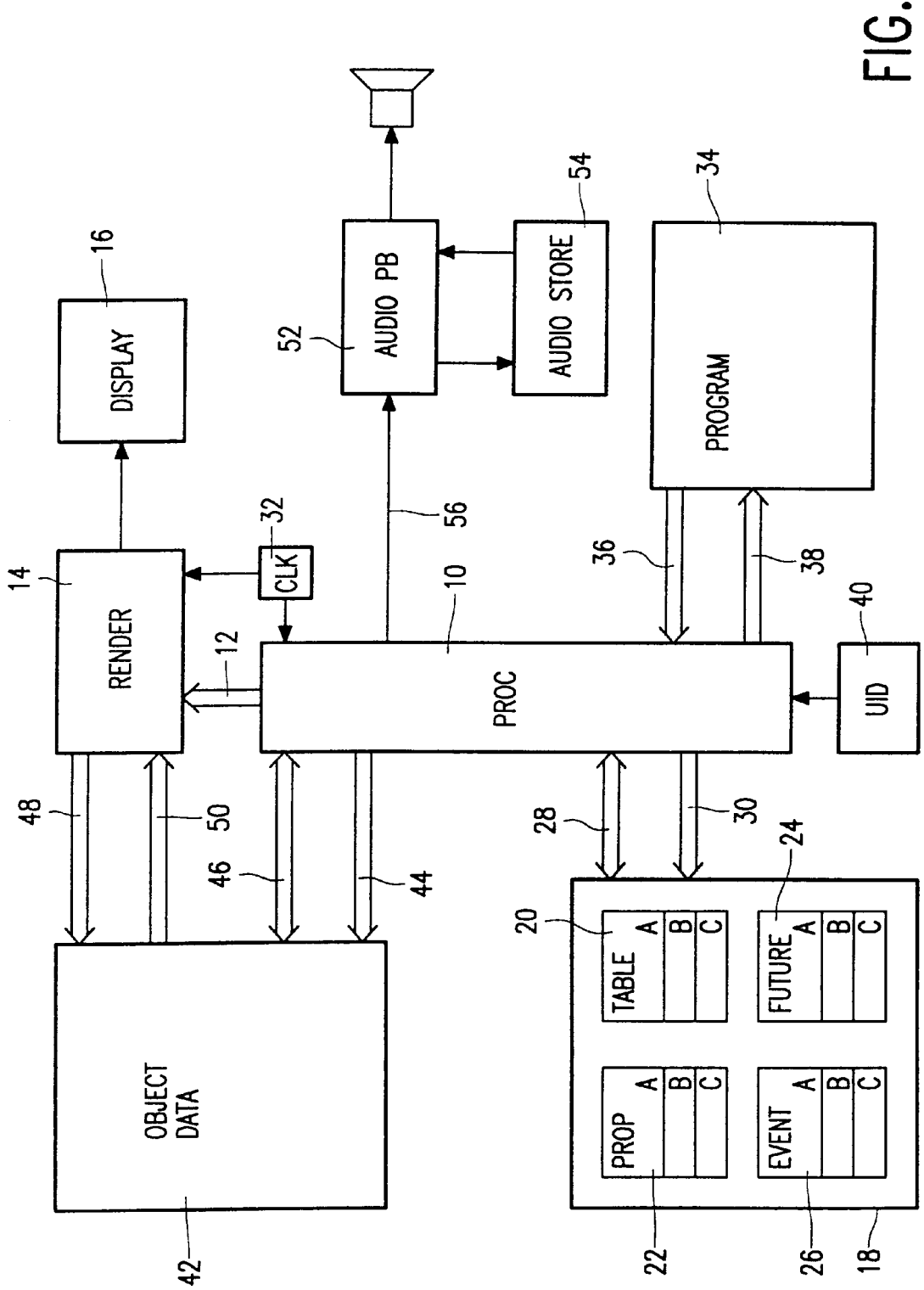
FIG. 1 is a block schematic diagram of a rule-based data processing apparatus according to a first embodiment of the present invention.

FIG. 1 shows an interactive entertainment apparatus based around a rule-based data processing apparatus embodying the present invention. The apparatus comprises a processor 10 operating on a compiled asynchronous logic circuit representation defined by a population of RTA rules. Through control and data link 12, the processor 10 is enabled to control a multi-character interactive animation for which scenes are generated by image rendering stage 14 and output to display 16. The processor 10 has associated with it a number of data stores, a first of which is random access memory (RAM) 18 which itself provides a number of discrete storage areas, a first of which 20 holds a table containing details of the various elements of the asynchronous logic circuit representation of the compiled population of RTA rules, with discrete areas of the table holding the details for script agents 20A, operator agents 20B, and object agents 20C, as will be described. The compilation of RTA rules to an asynchronous logic circuit representation is described in greater detail in our European patent application EP-A-0704077 (PHB 33903) the disclosure of which is incorporated herein by reference.

Each of the behaviours (register elements), time annotations (delay elements) logic function elements and rules forming the asynchronous logic circuit representation has a row in the table 20. Each row in the table identifies the element number, a state flag of the device, a queued status flag of the device, the internal status, and a propagate function start address in known manner. When the state of the element to which the row of the table relates changes (referred to herein as an event), a propagate function is executed to effect any appropriate changes to all of the elements which may be affected by such a change. These propagate functions are conveniently arranged at certain memory locations or start addresses within another area 22 of the RAM 18. The RAM also provides discrete storage areas for future element state changes 24 and an event stack 26. These features perform their conventional functions although, as with the table 20, each of the memory areas 22, 24, 26 is divided into discrete areas for the script agents (suffix A), operator agents (suffix B) and object agents (suffix C). The RAM 18 is connected to the processor 10 by a data bus 28 and an address bus 30 in known manner. Also in known manner, a clock (CLK) 32 is connected to the processor and, as shown, the rendering stage 14.

A read-only memory (ROM) 34 is coupled to the processor 10 by a data bus 36 and address bus 38 and provides a program store holding a command structure governing implementation of the compiled circuit representation for each of the agents—script, operator, or object. The processor 10 operates on the circuit representation as directed by the command structure, with propagation through the circuit equating to responding to the satisfaction of condition behaviours by generating one or more further behaviours defining the associated response for the various rule populations embodied by the circuit representation. A user interface device (UID) 40 is provided to enable input of control data and commands directly to the processor 10; the form of the UID will depend on what is required by the application, and may range from one or two simple buttons to keyboard/mouse input in conjunction with a graphical user interface on display 16 and generated by the rendering stage 14.

The use of the form of a rule-based system embodying the present invention addresses the problem of how to create a performance of a scripted scenario using a set of operator agents as virtual actors playing, for example, characters in a computer game. Data defining the layout and appearance of a virtual environment is held in a further RAM 42 together with data defining the appearance and current position within the virtual environment of various objects ("props" such as tables, chairs, books, etc.) and each of the virtual actors. The processor 10 has read/write access to the RAM 42 via address 44 and data 46 buses, whilst the rendering stage 14 has read-only access via respective address 48 and data 50 buses. Audio accompaniment to the images of the virtual environment may be provided by an audio playback stage 52 which accesses data from a respective audio data store 54 and is under the direction of the processor 10 through control line 56.

The script directing the virtual actors is represented at run-time by a chain of autonomous script agents and so plays an active part in the operation of the system, with the virtual actors being distinct groupings of agents whose activity is partly determined by the situation in which they are embedded (and which their activity is helping to construct) and partly by the script which they enact. The control of the performance of the script is distributed amongst the virtual actors, each of which is responsible for identifying the sentence in the script to be performed and for identifying the cue for performing it—typically when the previous sentence has been performed, where a 'sentence' may correspond to a speech by an actor, or a stage direction.

Each virtual actor may comprise a highly complex arrangement of interlinked agents governing not only how the virtual actor is to physically handle a task, but also behavioural aspects which may in turn affect the physical operation. The actions performed by the virtual actors are used additionally to update the data on their appearance held in RAM 42 such that the rendering stage 14 need only determine where to generate the updated representation in relation to the image of the virtual environment. To handle the function for intermediate objects, the theatrical "props" such as a door which may be open or closed or a book which may be passed from one character to another, a relatively simple class of operator agents, referred to hereinafter as object agents, is provided.

Figure 2:
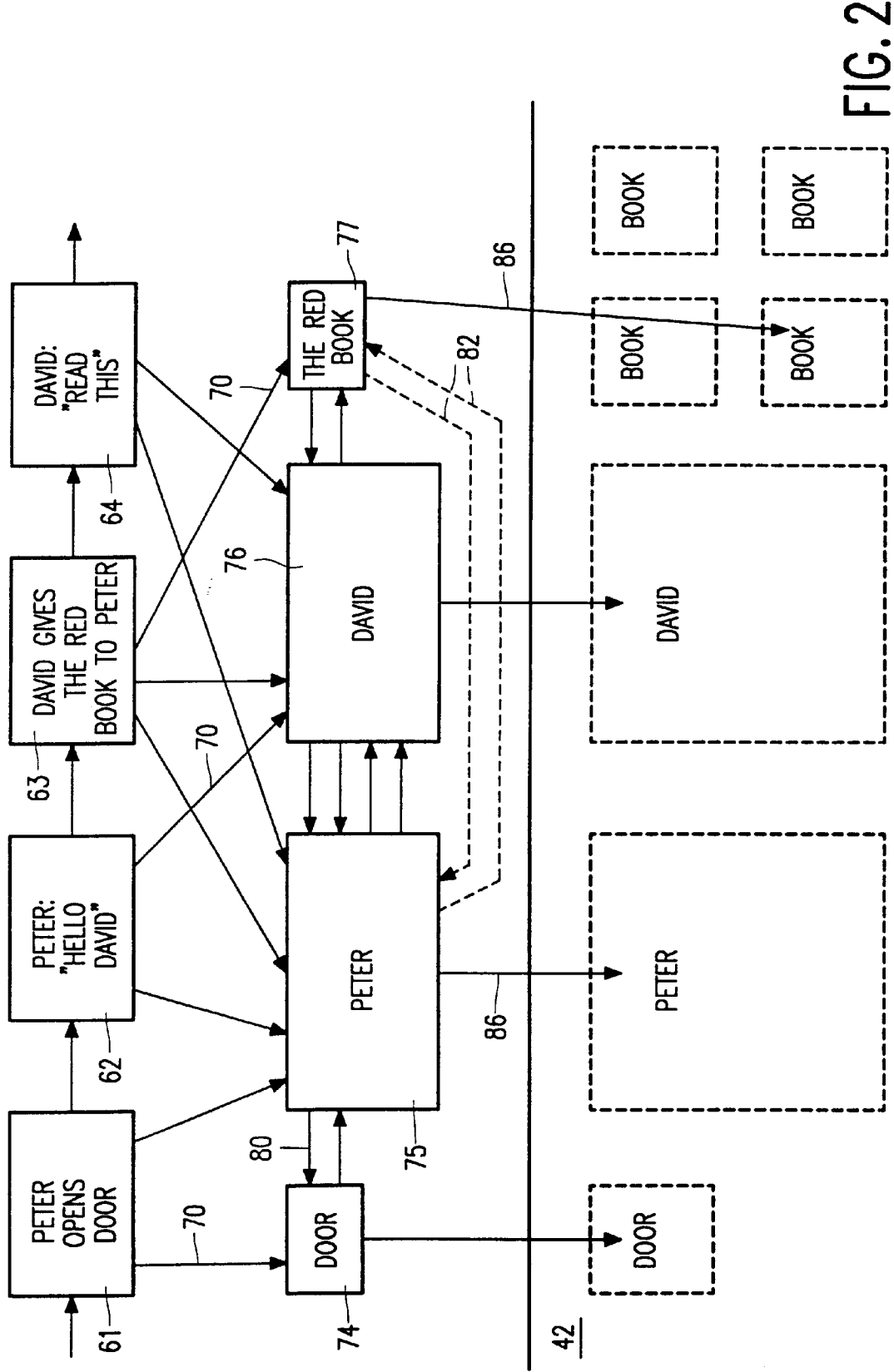
FIG. 2 is a schematic diagram illustrating a sequence of script agents linked to associated object and operator agents.

As schematically illustrated in FIG. 2, each script agent 61–64 contains within it markers 70 on the actor performing it, and on the other actors and object agents that are involved in its performance. The Figure represents a brief extract from a scripted exchange between two virtual actors (Peter and David) during the course of which Peter opens a door (to a room where David is) and greets him: David responds by handing a red book to Peter and telling him to read it. This is broken down into four script agents 61—64 with respective markers to the object agent 74 representing the door, operator agents 75, 76 for the respective characters Peter and David, and object agent 77 representing the red book. Also schematically represented at the bottom of the Figure is the data store (RAM 42; FIG.1) with the agents 74–77 having respective pointers 86 to the area of the store holding their data. Note that the "red book" object agent 77 has a pointer to the data for a particular one out of four books for which data is stored: the particular relevance of this will become apparent below.

The first script agent 61 ("Peter opens door") has markers 70 on both the Peter operator agent 75 and the door object agent 74, which Peter may be required to open using internal skills and in a "style" determined by others of his internal characteristics. The exact form of interaction between the 'Peter' and 'door' agents (represented by links 80) is not explicitly scripted but instead merely initiated by the script.

The second script agent 62 (Peter says "Hello David") has markers to both the 'Peter' agent 75 and the 'David' agent 76. Whilst David does not have a direct role from script agent 62, his presence within the room is required if Peter's utterance is to have any meaning; the completion of actions associated with the script agent 62 is also the cue for the actions of David as scripted in the following script agent 63 ("David gives the red book to Peter"), which script agent has markers 70 on the agents for David 76, Peter 75 and the red book 77. In terms of the interaction between the virtual actors, that between Peter and the door (represented by links 80) ceases when the storyline moves to script agent 62 which does not have a marker on the door 74, whilst the interaction between Peter and the book (represented by dashed links 82) is not established until script agent 63 is reached which has markers on both Peter and the book. Script agents also have additional internal state and behaviour, described below, which may for instance register whether the action that they represent has been performed.

In operation, each of the virtual actors performs the script by searching forwards through the chain of script agents for the next action it is to perform, and searching backwards from that point to find the script agent corresponding to the cue for its next action, generally (but not necessarily) the immediately preceding script agent. From the markers held by the two script agents it is a relatively simple matter for the virtual actor agents to determine the virtual actor from whom it takes its cue, and the virtual actors and objects with respect to which its action needs to be performed.

A problem which can occur with the system described above arises from the script agents being constructed in advance of the performance, such that the object referred to may not exist as a stored entity in RAM 42 at the time that a particular sentence of script is "read". Even if the object does exist, it may only be specifically identified by one or more qualifier terms in the absence of which it cannot be known, for example, which particular one from a group of objects it is. For instance, in the script agent 63 ("David gives the red book to Peter"), the particular book may not have been present at the time that the script agent was created and one of the qualifier terms—that the book existed—could not have initially applied to the particular book. In order to overcome this, for each object referred to, the respective object agent acts as a proxy for the actual object.

Each object agent is configured to contain information corresponding to the referential expression that caused it to be created. For example, in "the red book on the table" the object has three qualifier terms: firstly, it is definite; secondly that it is coloured red; and thirdly that it is positioned on a second object, the table (which will have its own object agent). This information is recorded in the object agent's internal state by the autonomous activity of the object agent itself. A way of doing this is for the object agent to be presented with the words in the referential expression in sequence and to update its own state accordingly. For this, the object agent requires at least a limited 'vocabulary' such as to enable the classification of received words into relational terms and forms (on the table, Arthur's glass), adjectives applied to objects (the red book, the broken chair), and specific or general terms (the book or a book), with the remainder being regarded as objects which may be found in the virtual world.

With the processor (10; FIG. 1) compiling the run-time representation of the script each time a new referential expression is encountered in the chain of script agents, all of the object agents in parallel check the information contained in the referential expression (one or more objects each with one or more qualifier terms) against that recorded in their internal state to determine whether they are being referred to. If so, the object agent is marked by the script agent that is currently being instantiated (the script agent containing the referential expression). If two or more object agents match the referential expression, a single one may be elected by propagating activation back through the set of script agents, with the most recently matching object agent being chosen. This means that when a particular referential expression has acquired an actual referent in terms of a particular object specification in RAM 42 (by various techniques as described below), all other uses of the same expression will automatically refer to the same object in the virtual world because they already have markers on the same object agent, although a facility for changing the acquired referent may be provided, as will be described.

When the performance of the script starts, and while it is in progress, object agents referred to by the script agents need to be linked to the particular objects or positions in the simulated world that they represent (via pointers 86 to the data store in RAM 42) so that the operator agents can determine, for instance, what object to act on or where to go to. There are various ways for achieving this, a first of which is for the object agents to be configured to independently and autonomously examine the data structure representing the characters, objects, and simulated world in RAM 42 and determine for themselves which object they represent. If the referent is, for example, "the red book" or "the kitchen window", the object agent searches the data structure for instances of these objects and, if only a single instance is found, the object agent places a marker on it by generating an internal pointer to the object location in the data structure.

A second method is for the object agents to be configured to actively monitor what is going on in the simulated world so that, when it becomes possible to do so, they identify their referent and place a pointer 86 to it. Thus, the reference to "the red book" may initially have no referent, leading to the associated object agent 77 continually checking until one appeared (for example, when the character of David appears carrying a red book). In a basic implementation, the object agent continues to check the whole data structure until an instance of a book with the particular qualifier occurs: in a faster implementation, the operator agent is operable to determine changes to adjectival qualifiers of objects and, having determined the existence and location of all books (of any colour) within the data structure, it just monitors these until one of them acquires the qualifier "red", a match is made, and the object agent places its pointer 86.

A third method is for the more complex operator (actor) agents 75,76, when reading the script, to determine those object agents 77 that do not yet have explicit referents (i.e. have no pointers in place) and search the virtual world to find objects matching the descriptions. The search may be a check through the contents of the data structure (as described above) with the operator agents identifying located objects to the object agents. Suitably, however, the operator agents make a 'visual' search of the virtual world as it is presented to them, that is to say from a starting point and visual orientation within the virtual world. The first matching object to appear within the line of sight (which is not necessarily the closest to the operator agent) is the one identified to the object agent.

In any of these methods, when an appropriate referent is found, the state of the object agent is updated so that it marks the object found by generating a pointer 86.

These methods of determining referents are complementary. For instance, it may be that there is only one red book in the virtual world, in which case the referent of "the red book on the table" can be found by the corresponding object agent directly from the world data structure. Alternatively, if there are many red books in the world, the object agent can monitor the state of the table to determine when a red book has been placed on it. The third possibility is that the operator agent (actor) performing the script agent that refers to the book could look at the table (as a part of its normal activity) in order to determine which book is being referred to. This explicit, "acted out", search for a referent would be appropriate for instance if the book is referred to by another actor as part of the dialogue.

A particular functionality that is required, and which is provided by the present invention, is the tracking of ownership, so that objects can be referred to by phrases such as "Arthur's plate". The object agent handling this referential expression has no referent (cannot find a matching qualifier term) until events bring about the conjunction of the operator agent "Arthur" and the virtual world object corresponding to a plate. The object agent therefore monitors what is happening in the virtual world by detecting changes to the contents of RAM 42 (FIG. 1) so that, when the Arthur operator agent is given a plate, the object agent places its pointer on the data representing that plate. For handling transient relationships, such as ownership, which may alter during the course of the script, the object agents are suitably arranged to continuously monitor the conditions which led to the original pointer placing and remove the pointer if those conditions are no longer true. In the example, when Arthur has finished his meal and ceases to have an interest in that particular plate, the object agent determines for example that the operator agent is no longer looking at the plate and removes the pointer. This allows the phrase "Arthur's plate" to be subsequently re-used in respect of a different plate rather than requiring a separate referential expression for each, such as "Arthur's blue plate", "Arthur's plate on the kitchen table" and so forth.

The meaning of an object identifier such as "the plate" can also vary according to its context. In the case of a script agent representing the sentence "Bill picks up the plate", the third method for identification described above is used, with the object agent representing "the plate" monitoring the activity of the operator agent "Bill" and placing a pointer on the plate data as soon as Bill picks up a plate—or perhaps even as soon as Bill selects the plate that he is going to pick up, the selection being controlled either as a directly scripted action or directed by internal characteristics of the Bill operator agent, such as colour preference and/or the first identified plate within the field of vision.

Certain referential expressions need to be evaluated (according to context) from the viewpoint of a particular actor rather than from a global viewpoint. For instance, in "Arthur looks for his glass" the glass referred to is that glass that Arthur finds and believes to be his, which is not necessarily the glass that he originally put down somewhere. To facilitate this, the object agent representing "his glass" in this context needs to be able to distinguish between the glass that we, the audience, believe to be Arthur's and the glass that Arthur believes to be his. This may be handled at a script level with "Arthur's glass" being used initially, such that different glasses may be marked by the respective object agents "Arthur's glass" and "his glass", although this imposes its own restrictions on script writing which would otherwise be avoided by treating the expressions as synonymous with the respective object agents having pointers to the same glass data. Preferably, the above-mentioned technique of continuous monitoring and pointer removal is used in the operator agent such that, when Arthur puts his glass down, the association is broken (the pointer removed) and has to be re-made according to the applied criteria; for example, the last glass that the Arthur operator agent encounters prior to the next instance of the "his glass" referential expression. In a modification to these techniques, a time limit may be specified in object agents handling transient relationships whereby, if not referred to by a script agent for a predetermined period (which may be measured by a counter function within the processor 10 counting a set number of clock pulses from CLK 32), the established pointers are removed. This would result in the Arthur operator agent "forgetting" which was his glass if, for instance, he did not touch it for five minutes.

The principal advantage of representing objects by means of autonomous agents as described above is that the referents of object (the matching of qualifier terms) can be established automatically during performance (run-time propagation through the chain of script agents), so making it possible to refer to objects by means of a much wider range of referential expressions than has heretofore been possible. From a user point of view, this makes scripts easier to read and write.

Notional objects can easily be referred to that have no existence in the physical simulation, either because at that point in the simulation they have not been created, or else because they are in some sense abstract and do not have an individual physical form specified in the data structure of RAM 42. Examples of abstract objects include places, features of objects (such as the nose on a face which, typically in a 3—D model, is not distinguished as a separate object), gaps between objects, and abstract objects that have no physical reality at all, such as promises.

Another advantage in decoupling the representations of the objects in the script from the 'actual' objects in the virtual world is that clauses or referential expressions can be accommodated which refer to past or future states of the virtual world (allowing more natural scripting using verbs with past or future tenses). This enables expressions such as 'the glass which was on the table" to be handled without any modifications to the basic mechanism. Also, introducing the set of object agents decouples the run-time representation of the script from the particular virtual world that it is performed in. This makes it simple to perform the same script in different worlds, or to rehearse the script without any simulated physical world at all. Changes can easily be made to the "scenery" of the 3—D simulated world without affecting the validity or performance of the script, because the script, in its arrangement of object, operator and script agents, automatically links itself to the world as it finds it.

Whilst described above in terms of an interactive entertainment apparatus, it will be readily recognised how the basic data processing apparatus may instead be utilised for industrial or other process control, the script agents defining the process, the operator agents handling the implementation of individual process stages, and the object agents handling the representation and identification of the individual components and subassemblies. FIG. 3 shows a modified version of the system of FIG. 1 for such process control. Where applicable, the same numbering is used for corresponding features which will not again be described.

Instead of the rendering, display and audio stages of FIG. 1, an interfacing link 90 is provided, connected to the processor 10 by control and data buses 92, 94. The particular form of the interface link 90 will be determined by the process being controlled, as will be well understood.

In the FIG. 3 embodiment, the program store is not a separate entity but instead forms a further discrete area 34' of the RAM 18. (Alternatively, the FIG. 1 arrangement could have the table of propagate functions 22 as a discrete area within program store ROM 34.) The object data store 42' in FIG. 3 contains data representations for the various components used in the process, both in initial and partially processed forms, which partially processed forms do not of course exist at the start of the process and would provide the previously described reference problems without the employment of the present invention.

From reading the present disclosure, other modifications will be apparent to persons skilled in the art. Such modifications may involve other features which already known in the field of data processing apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A rule-based data processing apparatus comprising:
   a processor coupled with first and second memory means, said first memory means having stored therein first and second groups of agents, each group of agents being defined by respective sets of rules, said processor being arranged to run said respective sets of rules in parallel, and said second memory means having stored therein data defining a plurality of objects, at least some of the data having a respective qualifier term associated therewith, the agents of the first group being script agents and being arranged as a sequentially enabled chain, one or more of said script agents including a respective reference to one of said objects and a specified qualifier term; and each of the agents of the second group being object agents and being operable to identify an object and specified qualifier term from a script agent, to identify an instance or each instance of said object in the second memory means, to compare the specified qualifier term with the respective associated qualifier term of each identified object and, when a match occurs, to generate an identifying pointer for the identified and matched object.

2. Apparatus as claimed in claim 1, wherein every script agent including a common object reference and specified qualifier term identifies a common object from the second memory means via a single object agent, with each of those script agents having a respective marker on said object agent.

3. Apparatus as claimed in claim 1, wherein said first memory means has stored therein at least one further group of agents being an operator agent, said operator agent being arranged to carry out a selected one of two or more procedural steps, with the selection being made within the operator agent on the basis of one or more external factors, and the selection operation within the operator agent is triggered prior to the enablement of a script agent carrying a marker identifying the operator agent, and subsequent to enablement of a preceding script agent of the sequence.

4. Apparatus as claimed in claim 3, wherein one or more stored object associated qualifier terms is controllably varied by one of said operator agents during sequential enablement of said script agents.

5. Apparatus as claimed in claim 3, comprising two or more operator agents wherein at least one of said external factors, on the basis of which one of the operator agents makes said selection, is the current setting of a controllably variable value set by another of the operator agents.

6. Apparatus as claimed in claim 3, wherein each of said script agents is configured to identify when an operator agent or each operator agent for which it carries a marker has made said selection following triggering by the enablement of a preceding script agent, and to modify an internal behaviour value on making said identification.

7. Apparatus as claimed in claim 2, wherein: said first memory means has stored therein at least one further group of agents being an operator agent, said operator agent being arranged to carry out a selected one of two or more procedural steps, with the selection being made within the operator agent on the basis of one or more external factors, and the selection operation within the operator agent is triggered prior to enablement of a script agent carrying a marker identifying the operator agent, and subsequent to enablement of a preceding script agent of the sequence.

8. Apparatus as claimed in claim 7, wherein one or more stored object associated qualifier terms is controllably varied by one of said operator agents during sequential enablement of said script agents.

9. Apparatus as claimed in claim 7, comprising two or more operator agents wherein at least one of said external factors, on the basis of which one of the operator agents makes said selection, is the current setting of a controllably variable value set by another of the operator agents.

10. Apparatus as claimed in claim 7, wherein each of said script agents is configured to identify when an operator agent or each operator agent for which it carries a marker has made said selection following triggering by the enablement of a preceding script agent, and to modify an internal behaviour value on making said identification.

11. Apparatus as claimed in claim 1, wherein each of said script agents is configured to unload itself from said first memory means following enablement.

12. Apparatus as claimed in claim 1, further comprising timer means coupled with said processor and arranged to count out a predetermined period following generation of said identifying pointer, a respective object agent being arranged to delete said identifying pointer on expiry of said predetermined period, to repeat identification of object instances within said second memory means and comparison of specified qualifiers, and to generate a further identifying pointer.

13. Apparatus as claimed in claim 1, wherein one or more of said object agents is operable to determine when a specified qualifier term and a respective associated qualifier term no longer match and to remove a previously generated identifying pointer.

14. A process control apparatus comprising:
a rule-based data processing apparatus comprising:
a processor coupled with first and second memory means, said first memory means having stored therein first and second groups of agents, each group of agents being defined by respective sets of rules, said processor being arranged to run said respective sets of rules in parallel, and said second memory means having stored therein data defining a plurality of objects, at least some of the data having a respective qualifier term associated therewith, the agents of the first group being script agents and being arranged as a sequentially enabled chain, one or more of said script agents including a respective reference to one of said objects and a specified qualifier term, each of the agents of the second group being object agents and being operable to identify an object and specified qualifier term from a script agent, to identify an instance or each instance of said object in the second memory means, to compare the specified qualifier term with the respective associated qualifier term of each identified object and, when a match occurs, to generate an identifying pointer for the identified and matched object, and said first memory means has stored therein a group of agents being operator agent, each said operator agent being arranged to execute a selected one of two or more procedural steps, said selected one being made within the operator agent based on one or more external factors; and external interface means coupled with the processor of said rule-based data processing apparatus, said external interface means being configured to control a plurality of external processes linked thereto on triggering of respective operator agents.

15. Interactive entertainment apparatus comprising:
a rule-based data processing apparatus comprising:
a processor coupled with first and second memory means, said first memory means having stored therein first and second groups of agents, each group of agents being defined by respective sets of rules, said processor being arranged to run said respective sets of rules in parallel, and said second memory means having stored therein data defining a plurality of objects, at least some of the data having a respective qualifier term associated therewith, the agents of the first group being script agents and being arranged as a sequentially enabled chain, one or more of said script agents including a respective reference to one of said objects and a specified qualifier term, and each of the agents of the second group being object agents and being operable to identify an object and specified qualifier term from a script agent, to identify an instance or each instance of said object in the second memory means, to compare the specified qualifier term with the respective associated qualifier term of each identified object and, when a match occurs, to generate an identifying pointer for the identified and matched object; and said first memory means has stored therein a group of agents being operator agent, each said operator agent being arranged to execute a selected one of two or more procedural steps, said selected one being made within the operator agent based on one or more external factors; and output means coupled with the processor of said rule-based data processing apparatus and arranged to generate an indication of operation of an operator agent or each operator agent.

16. Apparatus as claimed in claim 15, wherein said output means comprises rendering means coupled with said second memory means and operable to generate an image of a virtual environment from data stored in said second memory means and to animate or more modelled features in said environment, the animation of the modelled feature or each of said modelled features being controlled by a respective operator agent.

* * * * *